United States Patent
Luo (10) Patent No.: US 9,274,334 B2
(45) Date of Patent: Mar. 1, 2016

(54) DUST REMOVAL SYSTEM, IMAGE CAPTURE DEVICE AND DUST REMOVAL VIBRATION METHOD THEREOF

(75) Inventor: Yi-Shun Luo, Tainan (TW)

(73) Assignee: ALTEK CORPORATION, Hsinchu (TW)

( * ) Notice: Subject to any disclaimer, the term of this patent is extended or adjusted under 35 U.S.C. 154(b) by 926 days.

(21) Appl. No.: 13/527,296

(22) Filed: Jun. 19, 2012

(65) Prior Publication Data

US 2013/0276627 A1 Oct. 24, 2013

(30) Foreign Application Priority Data

Apr. 18, 2012 (TW) .............................. 101113832 A (51) Int. Cl.
| | |
|---|---|
| H04N 5/225 | (2006.01) |
| B01D 46/46 | (2006.01) |
| G02B 27/00 | (2006.01) |
| H04N 5/217 | (2011.01) |

(52) U.S. Cl.
CPC .......... *G02B 27/0006* (2013.01); *H04N 5/2171* (2013.01)

(58) Field of Classification Search
CPC ....... H04N 5/2254; H04N 5/225; B01D 46/46
See application file for complete search history.

(56) References Cited

U.S. PATENT DOCUMENTS

| 2006/0279638 A1* | 12/2006 | Matsuda et al. ........... 348/208.7 |
| 2007/0171294 A1* | 7/2007 | Watanabe ..................... 348/340 |
| 2013/0286273 A1* | 10/2013 | Lin et al. ....................... 348/335 |

FOREIGN PATENT DOCUMENTS

JP         2008-42400 A         2/2008

\* cited by examiner

*Primary Examiner* — Tuan Ho
(74) *Attorney, Agent, or Firm* — Muncy, Geissler, Olds & Lowe, P.C.

(57) ABSTRACT

The invention is directed to a dust removal system, an image capture device and a dust removal vibration method thereof. The dust removal system includes a vibration generation module having a vibration unit which is arranged on a transparent object of an image capture device, and is driven to generate a vibration for dust removal, a vibration detection unit arranged on the transparent object and transform a vibration amplitude into a corresponding electrical signal so as to output a feedback signal continually, a compare unit outputting a control signal when the compare unit determines the feedback signal exceeds the threshold value, and a control unit controlling the vibration generation module based on the control signal to generate the corresponding vibration for dust removal. Thereby, an amplitude of the transparent object can be precisely obtained and the vibration can be precisely adjusted.

18 Claims, 5 Drawing Sheets

DUST REMOVAL SYSTEM, IMAGE CAPTURE DEVICE AND DUST REMOVAL VIBRATION METHOD THEREOF

CROSS-REFERENCE TO RELATED APPLICATION

This application claims the benefit of Taiwan Patent Application No. 101113832, filed on Apr. 18, 2012, in the Taiwan Intellectual Property Office, the disclosure of which is incorporated herein in its entirety by reference.

BACKGROUND OF THE DISCLOSURE

1. Field of the Disclosure

The present invention relates to a dust removal system, an image capture device and a dust removal vibration method thereof, and more particularly to the dust removal system, the image capture device and the dust removal vibration method thereof capable of directly detecting amplitudes of transparent objects, and then determining a way how a vibration generating module generates amplitudes to remove dust by vibration.

2. Brief Description of the Related Art

With the advent of the digital era and technological advances, changeable lens digital cameras, such as digital single lens reflex (DSLR) cameras, are becoming at popular selling prices and thus are becoming prerequisite 3C products for persons. The changeable lens digital camera has advantages of high image qualities, provides demand for various objectives of taking pictures and has a lens that can be replaced with one having a suitable focal length. However, when the lens is replaced, dust or other materials could pass into the inside of the changeable lens digital camera and could be attached to an image sensor. Thus, multiples ashy points could be shown on images and are led to affect picture qualities and user's mood. Besides, the above situation could happen due to dust or other materials attached to the inside of an image capture lens or glass at the outside.

In the prior art, a vibrating element is provided to vibrate an image sensor or glass of an image capture lens such that dust or other materials can fall off from the image sensor or the glass of the image capture lens. For dust removal, the vibrating element vibrates the image sensor or the glass of the image capture lens in suitable amplitudes that can be adjusted by a microprocessor based on driving signals of the vibrating element. However, in accordance with the above method, the best vibration can be generated by the vibrating element fabricated with errors only if adjusted. Furthermore, the suitable amplitudes of the vibrating element may not be those of the image sensor or the glass of the image capture lens. Accordingly, the amplitudes of the vibrating element, even if adjusted to suitable ones, may not be those of the image sensor or the glass of the image capture lens. The vibrating element is typically a piezoelectric material that is subject to having different amplitudes with a temperature varying. In the case, a temperature detector should be additionally arranged to detect a temperature of the vibrating element such that a compensation value is generated to correct vibrating conditions. However, with regards to this method, additional elements and circuits are needed and thus are led to be large obstructions of miniaturizing products.

In order to improve the above disadvantages and industrial application, a dust removal system, image capture device and dust removal vibration method thereof is proposed.

SUMMARY OF THE DISCLOSURE

In order to improve the above-mentioned problems of prior art, the present invention is directed to a dust removal system, image capture device and dust removal vibration method thereof for solving the traditional problems that the image sensor or the glass of the image capture lens has the amplitudes that are not effectively adjusted.

In accordance with an objective of the present invention, a dust removal system for a transparent object of an image capture device is proposed including a vibration generation module having a vibration unit which is arranged on the transparent object of the image capture device and is driven to generate a vibration for dust removal, a vibration detection unit arranged on the transparent object, wherein the vibration detection unit detects a vibration amplitude of the transparent object and transforms the vibration amplitude into a corresponding electrical signal so as to output a feedback signal for a time interval, a compare unit determining whether the feedback signal exceeds a threshold value and generating a control signal when the feedback signal exceeds the threshold value, and a control unit controlling the vibration generation module based on the control signal to generate the corresponding vibration for dust removal.

In accordance with an embodiment, when the feedback signal exceeds the threshold value, the control signal has a specific amplitude corresponding to the vibration amplitude of the transparent object. The control unit controls the vibration generation module based on the control signal to generate the vibration corresponding to the specific amplitude for dust removal.

In accordance with an embodiment, when the feedback signal has not exceeded the threshold value for a time interval, the compare unit generates a stop signal, and the control unit controls the vibration generation module upon the stop signal to stop the vibration unit from generating the vibration.

In accordance with an embodiment, the threshold value is generated based on a maximum value after a preset vibration scan or on the maximum value multiplied by a predetermined proportion.

In accordance with an embodiment, the control unit controls the vibration generation module to generate a non-standing wave or traveling wave to lead the vibration unit to generate the vibration. The vibration detection unit comprises a capacitive microphone.

In accordance with an embodiment, the vibration generation module comprises a frequency control unit determining a frequency of the vibration based on different working ranges or modes and the control signal.

In accordance with an objective of the present invention, an image capture device is proposed including an image sensor receiving an optical signal and transforming the optical signal into an image signal, a vibration generation module having a vibration unit which is arranged on the image sensor and is driven to generate a vibration for dust removal, a vibration detection unit arranged on the image sensor, wherein the vibration detection unit detects a vibration amplitude of the image sensor transforms the vibration amplitude into a corresponding electrical signal so as to output a feedback signal continually, a compare unit determining whether the feedback signal exceeds a threshold value and generating a control signal when the feedback signal exceeds the threshold value, and a control unit controlling the vibration generation module based on the control signal to generate the corresponding vibration for dust removal.

In accordance with an embodiment, when the feedback signal exceeds the threshold value, the control signal has a specific amplitude corresponding to the vibration amplitude of the image sensor. The control unit controls the vibration generation module based on the control signal to generate the vibration corresponding to the specific amplitude for dust removal.

In accordance with an embodiment, when the feedback signal has not exceeded the threshold value for a time interval, the compare unit generates a stop signal, and the control unit controls the vibration generation module upon the signal to stop the vibration unit from generating the vibration.

In accordance with an embodiment, the threshold value is generated based on a maximum value after a preset vibration scan or on the maximum value multiplied by a predetermined proportion.

In accordance with an embodiment, the control unit controls the vibration generation module to generate a non-standing wave or traveling wave to lead the vibration unit to generate the vibration. The vibration detection unit comprises a capacitive microphone.

In accordance with an embodiment, the vibration generation module comprises a frequency control unit determining a frequency of the vibration based on different working ranges or modes and the control signal.

In accordance with an objective of the present invention, a dust removal vibration method includes arranging a vibration unit of a vibration generation module on a transparent object of an image capture device; using the vibration generation module to drive the vibration unit to generate a vibration for dust removal; using a vibration detection unit arranged on the transparent object to detect a vibration amplitude of the transparent object when vibrated and to transform the vibration amplitude into a corresponding electrical signal so as to output a feedback signal continually; using a compare unit to determine whether the feedback signal exceeds a threshold value and to output a control signal when the feedback signal exceeds the threshold value; and using a control unit to control the vibration generation module based on the control signal to generate the corresponding vibration for dust removal.

In accordance with an embodiment, when the feedback signal exceeds the threshold value, the control signal has a specific amplitude corresponding to the vibration amplitude of the transparent object. The dust removal vibration method further comprises using the control unit to control the vibration generation module based on the control signal to generate the vibration corresponding to the specific amplitude for dust removal.

In accordance with an embodiment, The dust removal vibration method further comprises using the compare unit to generate a stop signal when the compare unit determines that the feedback signal has not exceeded the threshold value for a time interval; and using the control unit to control the vibration generation module upon the stop signal to stop the vibration unit from generating the vibration.

In accordance with an embodiment, the threshold value is generated based on a maximum value after a preset vibration scan or on the maximum value multiplied by a predetermined proportion.

In accordance with an embodiment, the control unit controls the vibration generation module to generate a non-standing wave or traveling wave to lead the vibration unit to generate the vibration. The vibration detection unit comprises a capacitive microphone.

In accordance with an embodiment, the vibration generation module comprises a frequency control unit. The dust removal vibration method further comprises using the frequency control unit to determine a frequency of the vibration based on different working ranges or modes and the control signal.

Accordingly, the dust removal system, image capture device and dust removal vibration method thereof has following advantages:

(1) The dust removal system, image capture device and dust removal vibration method thereof can use the vibration detection unit to detect the image sensor or glass of the transparent object. Thereby, temperature detectors can be saved to be used. Thus, cost can be reduced and circuits can be simplified.

(2) The dust removal system, image capture device and dust removal vibration method thereof can use the compare unit to determine whether the feedback signal exceeds a threshold value so as to generate an optimum vibration. Thereby, the optimum vibration can be detected with omission of processors. Thus, cost can be reduced and circuits can be simplified.

(3) The dust removal system, image capture device and dust removal vibration method thereof can use the vibration detection unit to detect the image sensor or glass of the transparent object. Thereby, the amplitude generated by the image sensor or glass of the transparent object can be precisely detected. Thus, vibration can be precisely adjusted.

DETAILED DESCRIPTION OF THE INVENTION

Illustrative embodiments accompanying with figures are now described below to lead the characteristics, contents, advantages and effects of the invention to be understood by the Examiner. Figures are illustrated only for explanation, but are not drawn to scale and precise arrangement, and thus the scope of the invention should not be limited by the scale and arrangement illustrated in the figures.

In accordance with the present invention, a dust removal system is suitable for vibrational dust removal to a transparent object of an image capture device, such as an image sensor or glass of an image capture lens, wherein the image capture device can be a changeable lens camera or a digital single lens reflex (DSLR) camera. The following explanation takes a changeable lens camera as an example and is not limited in practice.

Figure 1:
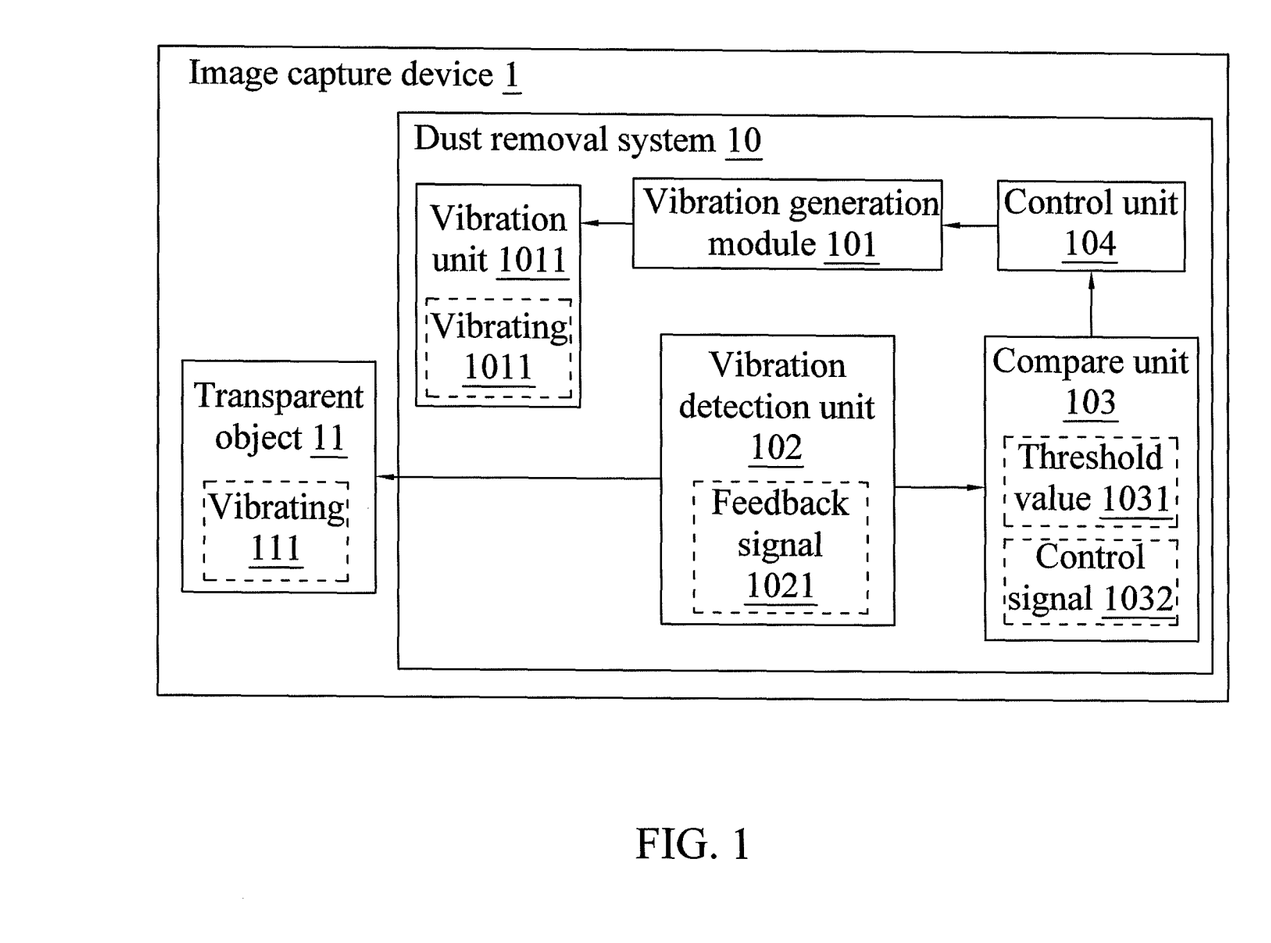
FIG. 1 is a block diagram of a dust removal system in accordance with the present invention.

FIG. 1 is a block diagram of a dust removal system in accordance with the present invention. Referring to FIG. 1, a dust removal system 10 for an image capture device 1 includes a vibration generation module 101, a vibration detection unit 102, a compare unit 103 and a control unit 104. The vibration generation module 101 comprises a vibration unit 1011 arranged on a surface of a transparent object 11 of the image capture device 1, wherein the vibration unit 1011 is driven to generate a vibration 10111 for dust removal, wherein the vibration unit 1011 can be a piezoelectric material and the transparent object 11 can be an optical glass of an image capture lens of the image capture device 1. The vibration detection unit 102 is arranged on the other surface of the transparent object 11 using a metal plate, wherein the vibration detection unit 102 detects a vibration amplitude of the transparent object 11 when vibrating 111 and to transform the vibration amplitude into a corresponding electrical signal, due to the vibration amplitude resulting in a voltage difference, so as to output a feedback signal 1021 for a time interval. The compare unit 103 determines if the feedback signal 1021 exceeds a threshold value 1031. If the feedback signal 1021 does not exceed the threshold value 1031, the vibration detection unit 102 performs the detecting process at all times. The compare unit 103 outputs a control signal 1032 when the feedback signal 1021 exceeds the threshold value 1031. The control unit 104 controls the vibration generation module 101 based on the control signal 1032 such that the vibration unit 1011 generates the vibration 10111 corresponding thereto for dust removal.

Figure 2:
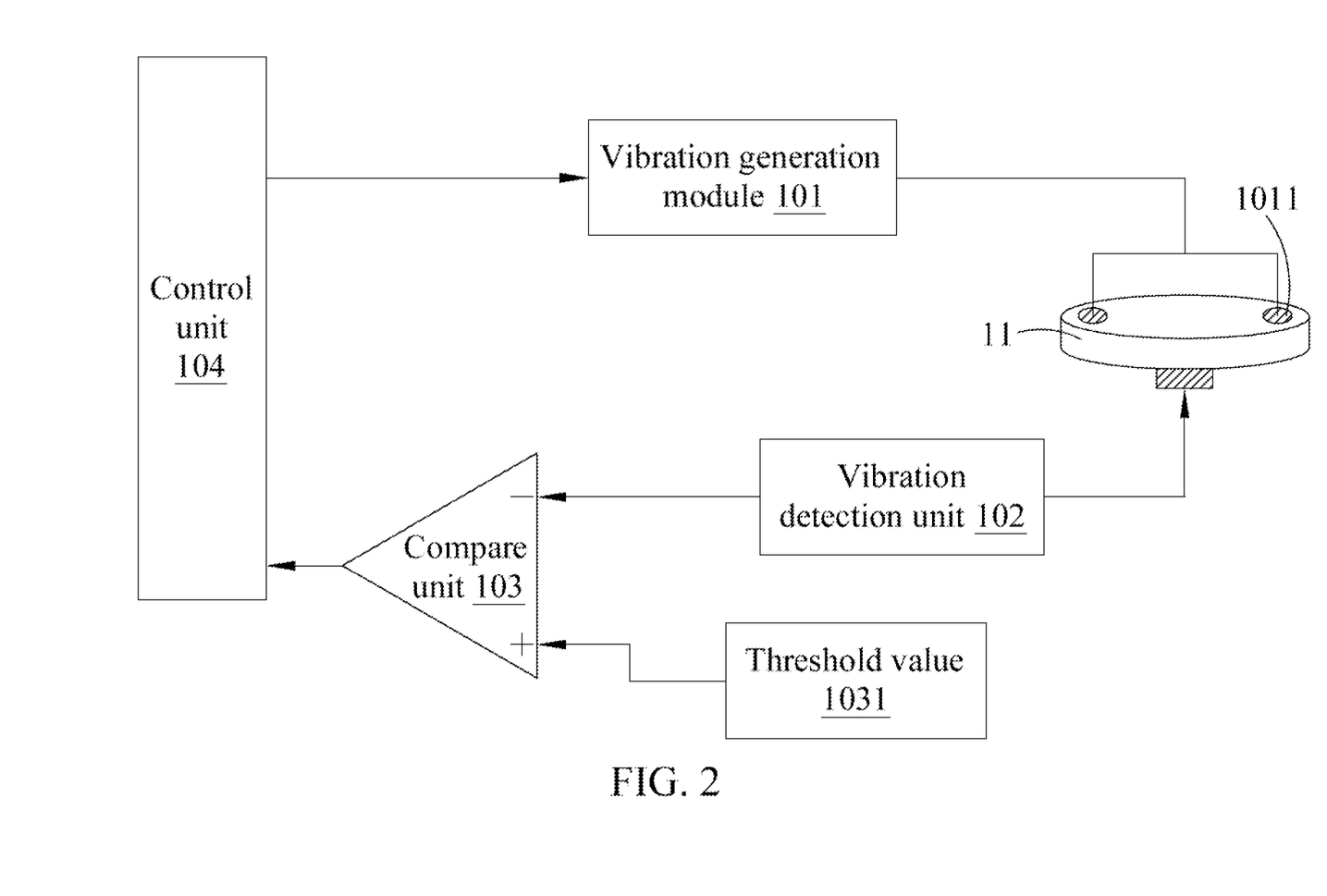
FIG. 2 is a schematic view of a dust removal system in accordance with the present invention.

FIG. 2 is a schematic view of a dust removal system in accordance with the present invention. Referring to FIG. 2, when the dust removal system 10 performs a dust removal process to the transparent object 11 of the image capture device 1, the vibration generation module 101 of the dust removal system 10 leads the vibration unit 1011 to generate the vibration 10111 in advance such that the transparent object 11 is driven to vibrate 111. At this time, the vibration detection unit 102 detects a vibration amplitude of the transparent object 11 when vibrating 111 and transforms the vibration amplitude into a corresponding electrical signal so as to output a feedback signal 1021 to the compare unit 103 continually. The compare unit 103 receives the feedback signal 1021 at all times and determines whether the feedback signal 1021 exceeds a threshold value 1031 at all times. If the feedback signal 1021 does not exceed the threshold value 1031, the compare unit 103 performs the receiving and determining processes at all times. The compare unit 103 outputs a control signal 1032 to the control unit 104 when the compare unit 103 determines that the feedback signal 1021 exceeds the threshold value 1031. At this time, the control unit 104 controls the vibration generation module 101 based on the control signal 1032 such that the vibration unit 1011 generates the vibration 10111 corresponding to the control signal 1032 and leads the transparent object 11 to vibrate 111. The threshold value 1031 can be generated based on a maximum value after a preset vibration scan or on the maximum value multiplied by a predetermined proportion, such as 80% of the maximum value. The preset vibration scan can be performed during delivery inspection or adjustment and meanwhile, the threshold value 1031 can be determined. Alternatively, the threshold value 1031 can be determined by a user. The control unit 104 controls the vibration generation module 101 to generate a non-standing wave or traveling wave to lead the vibration unit 1011 to generate vibration 10111. The vibration detection unit 102 comprises, but is not limited to, a capacitive microphone.

Figure 3:
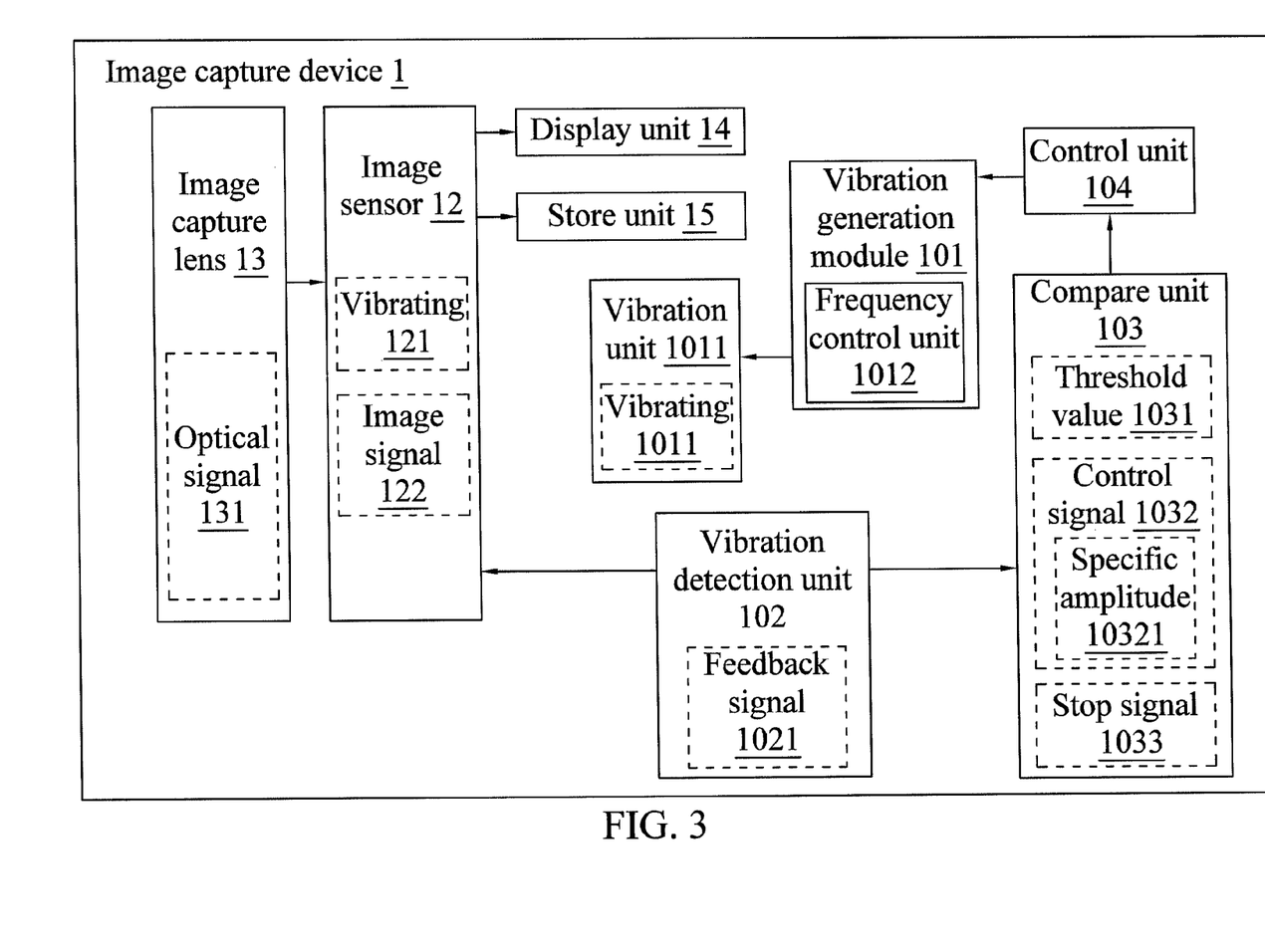
FIG. 3 is a block diagram of an image capture device in accordance with the present invention.
Figure 4:
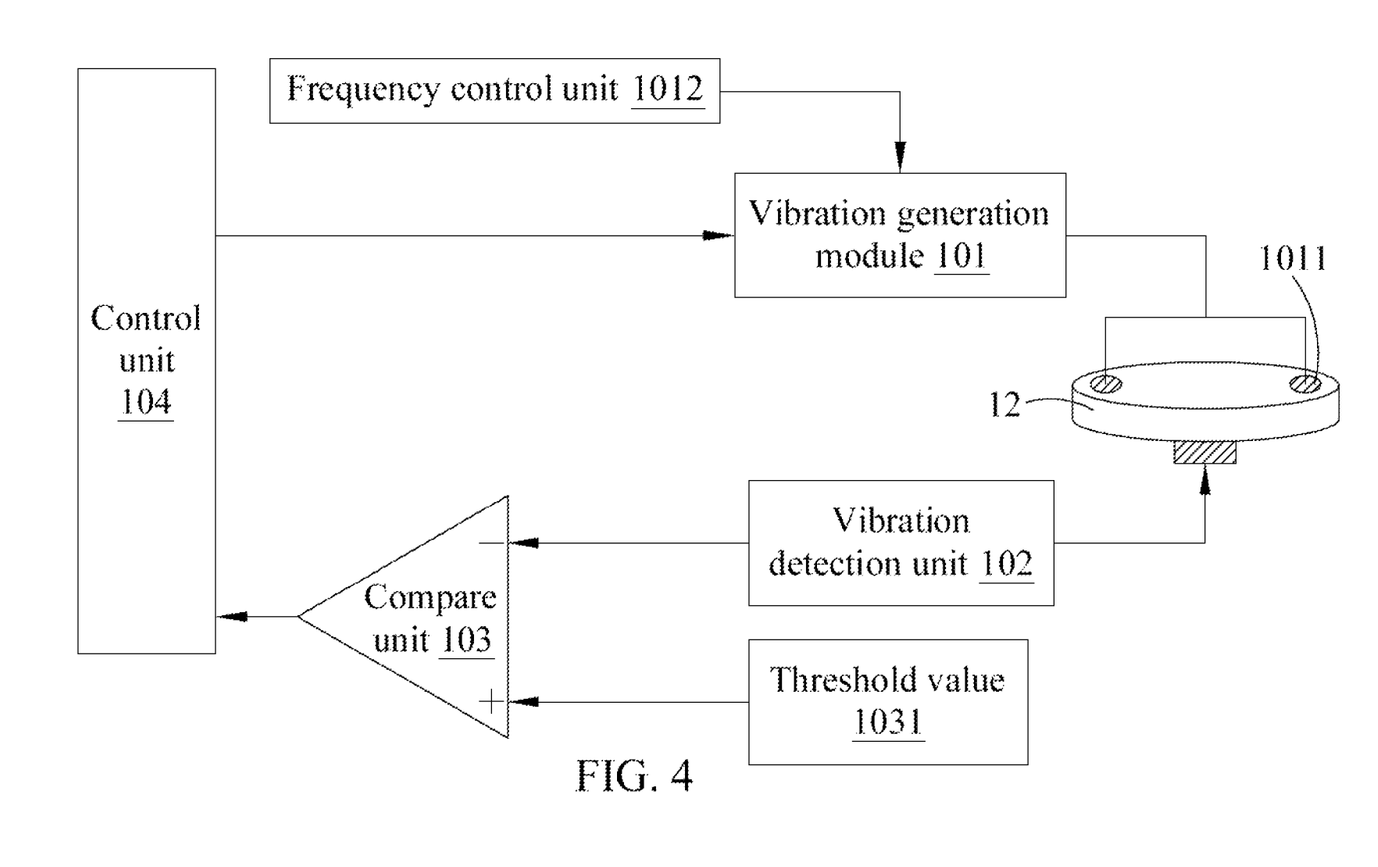
FIG. 4 is a schematic view of an image capture device in accordance with the present invention.

FIG. 3 is a block diagram of an image capture device in accordance with the present invention. FIG. 4 is a schematic view of an image capture device in accordance with the present invention. The embodiment is similar to the above-mentioned one, and the similar portions are omitted herein. Referring to FIGS. 3 and 4, an image capture device 1 includes a vibration generation module 101, a vibration detection unit 102, a compare unit 103, a control unit 104 and an image sensor 12. The image sensor 12 can be a complementary metal-oxide-semiconductor (CMOS) device or charge-coupled device (CCD) for receiving an optical signal 131 outputting from an image capture lens 13 and transforming the optical signal 131 into an image signal 122 that can be displayed on a display unit 14 of the image capture device 1 or stored in a store unit 15 of the image capture device 1. The vibration generation module 101 comprises a frequency control unit 1012 determining an amplitude or frequency of the vibration 10111 generated by the vibration unit 1011 of the vibration generation module 101 based on different working ranges or modes, such as different materials, thicknesses or properties, and the control signal 1032.

When particles or foreign materials attached to the image sensor 12 are found by a user via the image signal 122 displayed by the display unit 14, a control button (not shown) or touch control module (not shown) can be controlled by the user for vibrational dust removal. At the beginning, the vibration generation module 101 leads the vibration unit 1011 to generate the vibration 10111 in advance such that the image sensor 12 is driven to vibrate 121. At this time, the vibration detection unit 102 detects amplitudes of the vibrations 121 generated by the image sensor 12 and transforms a vibration amplitude between the vibrations 121 of the image sensor 12 into a corresponding electrical signal so as to output a feedback signal 1021 for a time interval.

Next, the compare unit 103 determines if the feedback signal 1021 exceeds a threshold value 1031 at all times. The compare unit 103 outputs a control signal 1032 when the feedback signal 1021 exceeds the threshold value 1031. If the feedback signal 1021 does not exceed the threshold value 1031, the compare unit 103 performs the determining process at all times. In case that the compare unit 103 has performed the determining process for a time interval, such as 1 minute, and the feedback signal 1021 has not exceeded the threshold value 1031, the compare unit 103 generates a stop signal 1033 leading the control unit 014 to control the vibration generation module 101 to stop the vibration unit 1011 from generating the vibration 10111.

The compare unit 103 outputs the control signal 1032 to the control unit 104 when the feedback signal 1021 exceeds the threshold value 1031. At this time, the control unit 104 receives the control signal 1032 and controls the vibration generation module 101 based on the control signal 1032 and a frequency determined by the frequency control unit 1012 based on different working ranges or modes such that the vibration unit 1011 generates the vibration 10111 corresponding to the control signal 1032 and leads the image sensor 12 to vibrate 121. When the feedback signal 1021 exceeds the threshold value 1031, the control signal 1032 has a specific amplitude 10321, that is, an amplitude of the vibration unit 1011 or the image sensor 12. The control unit 104 controls the vibration generation module 101 based on the control signal 1032 such that the vibration unit 1011 generates the vibration 10111 having an amplitude value equaling to the value of the specific amplitude 10321. In this embodiment, the vibration unit 1011 has an amplitude, but not limited to, acting as the specific amplitude 10321 when the feedback signal 1021 exceeds the threshold value 1031.

Figure 5:
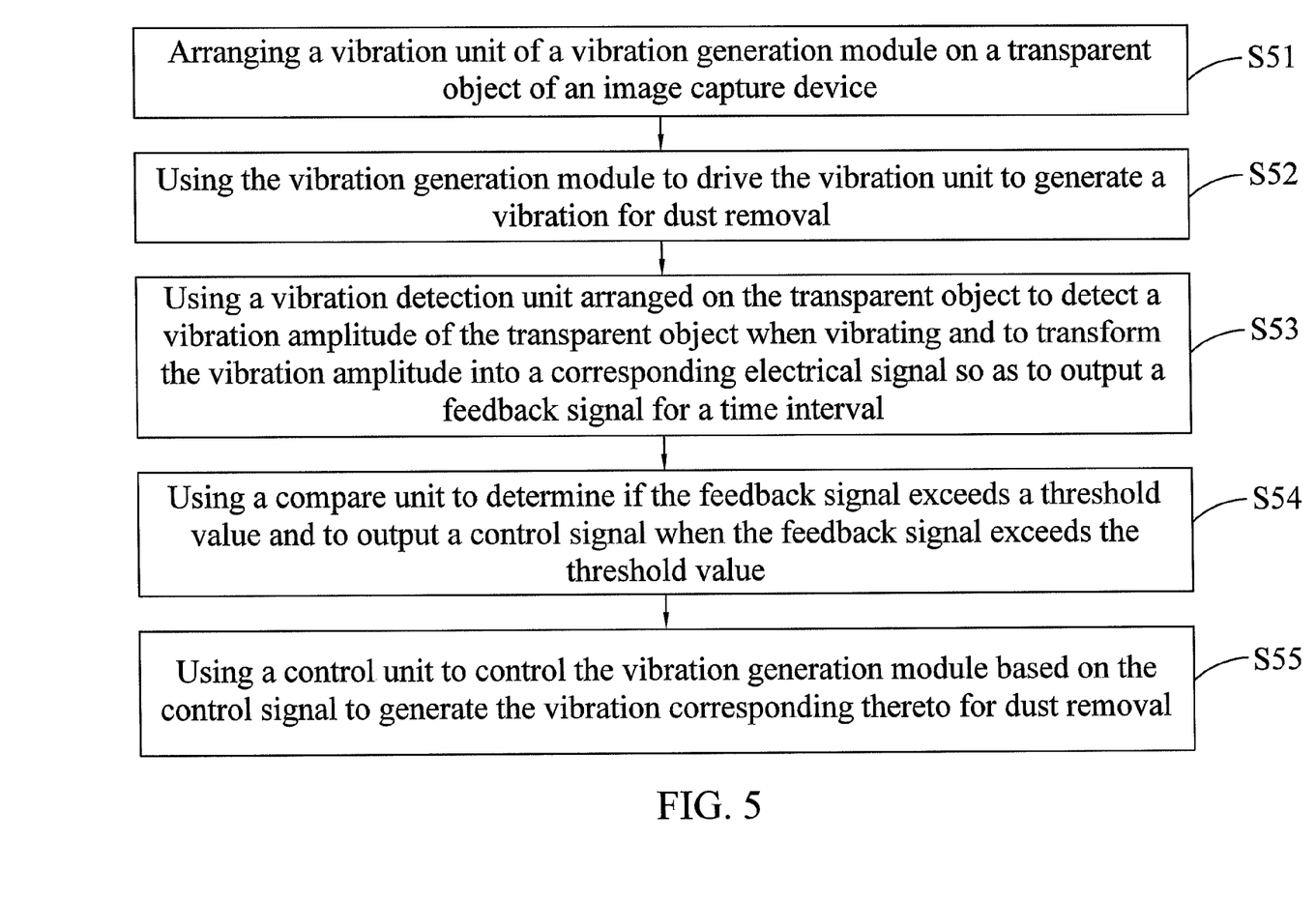
FIG. 5 is a process flow chart of a dust removal vibration method in accordance with the present invention.

FIG. 5 is a process flow chart of a dust removal vibration method in accordance with the present invention. Referring to FIG. 5, a dust removal vibration method is suitable for a transparent object of an image capture device. The dust removal vibration method includes the following steps:

Step S51 includes arranging a vibration unit of a vibration generation module on a transparent object of an image capture device;

Step 52 includes using the vibration generation module to drive the vibration unit to generate a vibration for dust removal;

Step 53 includes using a vibration detection unit arranged on the transparent object to detect a vibration amplitude of the transparent object when vibrating and to transform the vibration amplitude into a corresponding electrical signal so as to output a feedback signal for a time interval;

Step 54 includes using a compare unit to determine if the feedback signal exceeds a threshold value and to output a control signal when the feedback signal exceeds the threshold value; and Step S55 includes using a control unit to control the vibration generation module based on the control signal to generate the vibration corresponding thereto for dust removal.

In accordance with the present invention, illustrative embodiments accompanying with figures for the dust removal vibration method are described in the above dust removal system and image capture device, and are omitted herein.

To sum up, he dust removal system, image capture device and dust removal vibration method thereof can use the vibration detection unit to detect the image sensor or glass of the transparent object, use the compare unit to generate a control unit containing a specific amplitude, and then use the control unit to directly control the vibration generation module such that the vibration unit can generate the vibration having the specific amplitude and drive the image sensor or the glass of the image capture lens to vibrate. Thereby, the vibration unit is not subject to varying temperatures and temperature detectors can be saved to be used. The specific amplitude is directly employed such that the process to obtain the optimum vibration calculated by processors can be omitted. Thus, the traditional circuits and elements can be saved and cost can be reduced. Besides, the detection can be performed directly to the image sensor or the glass of the transparent object, but not to the vibration unit that generates the vibration not representing a real vibration of the image sensor or the glass of the transparent object, so the amplitude of the image sensor can be precisely obtained and the vibration can be precisely adjusted.

What is claimed is:

1. A dust removal system for a transparent object of an image capture device, comprising:
   a vibration generation module having a vibration unit which is arranged on the transparent object of the image capture device and is driven to generate a vibration for dust removal;
   a vibration detection unit arranged on the transparent object, wherein the vibration detection unit detects a vibration amplitude of the transparent object and transforms the vibration amplitude into a corresponding electrical signal so as to output a feedback signal for a time interval;
   a compare unit determining whether the feedback signal exceeds a threshold value and generating a control signal when the feedback signal exceeds the threshold value; and
   a control unit controlling the vibration generation module based on the control signal to generate the corresponding vibration for dust removal.

2. The dust removal system of claim 1, wherein the control signal has a specific amplitude corresponding to the vibration amplitude of the transparent object when the feedback signal exceeds the threshold value, wherein the control unit controls the vibration generation module based on the control signal to generate the vibration corresponding to the specific amplitude for dust removal.

3. The dust removal system of claim 1, wherein when the feedback signal has not exceeded the threshold value for the time interval, the compare unit generates a stop signal, and the control unit controls the vibration generation module upon the stop signal to stop the vibration unit from generating the vibration.

4. The dust removal system of claim 1, wherein the threshold value is generated based on a maximum value after a preset vibration scan or on the maximum value multiplied by a predetermined proportion.

5. The dust removal system of claim 1, wherein the control unit controls the vibration generation module to generate a non-standing wave or traveling wave to lead the vibration unit to generate the vibration, wherein the vibration detection unit comprises a capacitive microphone.

6. The dust removal system of claim 1, wherein the vibration generation module comprises a frequency control unit determining a frequency of the vibration based on different working ranges or modes and the control signal.

7. An image capture device comprising:
   an image sensor receiving an optical signal and transforming the optical signal into an image signal;
   a vibration generation module having a vibration unit which is arranged on the image sensor and is driven to generate a vibration for dust removal;
   a vibration detection unit arranged on the image sensor, wherein the vibration detection unit detects a vibration amplitude of the image sensor and transforms the vibration amplitude into a corresponding electrical signal so as to output a feedback signal continually;
   a compare unit determining whether the feedback signal exceeds a threshold value and generating a control signal when the feedback signal exceeds the threshold value; and
   a control unit controlling the vibration generation module based on the control signal to generate the corresponding vibration for dust removal.

8. The image capture device of claim 7, wherein the control signal has a specific amplitude corresponding to the vibration amplitude of the image sensor when the feedback signal exceeds the threshold value, wherein the control unit controls the vibration generation module based on the control signal to generate the vibration corresponding to the specific amplitude for dust removal.

9. The image capture device of claim 7, wherein when the feedback signal has not exceeded the threshold value for a time interval, the compare unit generates a stop signal, and the control unit controls the vibration generation module upon the stop signal to stop the vibration unit from generating the vibration.

10. The image capture device of claim 7, wherein the threshold value is generated based on a maximum value after a preset vibration scan or on the maximum value multiplied by a predetermined proportion.

11. The image capture device of claim 7, wherein the control unit controls the vibration generation module to generate a non-standing wave or traveling wave to lead the vibration unit to generate the vibration, wherein the vibration detection unit comprises a capacitive microphone.

12. The image capture device of claim 7, wherein the vibration generation module comprises a frequency control unit determining a frequency of the vibration based on different working ranges or modes and the control signal.

13. A dust removal vibration method comprising:
   arranging a vibration unit of a vibration generation module on a transparent object of an image capture device;
   using the vibration generation module to drive the vibration unit to generate a vibration for dust removal;
   using a vibration detection unit arranged on the transparent object to detect a vibration amplitude of the transparent object when vibrated and to transform the vibration amplitude into a corresponding electrical signal so as to output a feedback signal continually;

using a compare unit to determine whether the feedback signal exceeds a threshold value and to output a control signal when the feedback signal exceeds the threshold value; and using a control unit to control the vibration generation module based on the control signal to generate the corresponding vibration for dust removal.

14. The dust removal vibration method of claim 13, wherein the control signal has a specific amplitude corresponding to the vibration amplitude of the transparent object when the feedback signal exceeds the threshold value, further comprising using the control unit to control the vibration generation module based on the control signal to generate the vibration corresponding to the specific amplitude for dust removal.

15. The dust removal vibration method of claim 13 further comprising:

using the compare unit to generate a stop signal when the compare unit determines that the feedback signal has not exceeded the threshold value for a time interval; and using the control unit to control the vibration generation module upon the stop signal to stop the vibration unit from generating the vibration.

16. The dust removal vibration method of claim 13, wherein the threshold value is generated based on a maximum value after a preset vibration scan or on the maximum value multiplied by a predetermined proportion.

17. The dust removal vibration method of claim 13, wherein the control unit controls the vibration generation module to generate a non-standing wave or traveling wave to lead the vibration unit to generate the vibration, wherein the vibration detection unit comprises a capacitive microphone.

18. The dust removal vibration method of claim 13, wherein the vibration generation module comprises a frequency control unit, further comprising using the frequency control unit to determine a frequency of the vibration based on different working ranges or modes and the control signal.

* * * * *